US008584521B1

(12) United States Patent
Yang

(10) Patent No.: US 8,584,521 B1
(45) Date of Patent: Nov. 19, 2013

(54) ACCURATE GYROSCOPE DEVICE USING MEMS AND QUARTZ

(75) Inventor: Xiao "Charles" Yang, Cupertino, CA (US)

(73) Assignee: mCube Inc., San Jose, CA (US)

(*) Notice: Subject to any disclaimer, the term of this patent is extended or adjusted under 35 U.S.C. 154(b) by 289 days.

(21) Appl. No.: 13/008,865

(22) Filed: Jan. 18, 2011

Related U.S. Application Data

(60) Provisional application No. 61/356,467, filed on Jun. 18, 2010, provisional application No. 61/296,370, filed on Jan. 19, 2010.

(51) Int. Cl.
*G01P 1/02* (2006.01)

(52) U.S. Cl.
USPC .............................................. 73/493; 73/1.37

(58) Field of Classification Search
USPC .......................... 73/1.37, 493, 504.12, 504.16
See application file for complete search history.

(56) References Cited

U.S. PATENT DOCUMENTS

| | | | |
|---|---|---|---|
| 6,188,322 B1 | 2/2001 | Yao et al. | |
| 6,979,872 B2 | 12/2005 | Borwick et al. | |
| 7,258,009 B2 * | 8/2007 | Imai | 73/504.12 |
| 8,056,412 B2 * | 11/2011 | Rutkiewicz et al. | 73/493 |
| 2002/0072163 A1 | 6/2002 | Wong et al. | |
| 2004/0016995 A1 | 1/2004 | Kuo et al. | |
| 2004/0227201 A1 | 11/2004 | Borwick, III et al. | |
| 2005/0252293 A1 | 11/2005 | Won et al. | |
| 2008/0014682 A1 | 1/2008 | Yang et al. | |
| 2008/0066547 A1 * | 3/2008 | Tanaka et al. | 73/504.16 |
| 2008/0110259 A1 * | 5/2008 | Takeno | 73/504.12 |
| 2008/0210007 A1 * | 9/2008 | Yamaji et al. | 73/504.16 |
| 2009/0007661 A1 * | 1/2009 | Nasiri et al. | 73/504.03 |
| 2010/0109102 A1 | 5/2010 | Chen et al. | |
| 2011/0146401 A1 * | 6/2011 | Inaguma et al. | 73/504.12 |
| 2011/0265574 A1 | 11/2011 | Yang | |

OTHER PUBLICATIONS

International Search Report and Written Opinion of PCT Application No. PCT/US10/054567, mailed on Jan. 6, 2011, 7 pages total.

* cited by examiner

*Primary Examiner* — John Chapman, Jr.
(74) *Attorney, Agent, or Firm* — Kilpatrick Townsend and Stockton LLP

(57) ABSTRACT

An integrated inertial sensing device. The device includes a substrate member. The device also has a first inertial sensing device comprising at least a first material and configured to detect at least a first direction. The device has a second inertial sensing device comprising at least the first material and configured to detect at least a second direction. The device also has a third inertial sensing device comprising at least a quartz material and configured to detect at least a third direction. The three devices can be integrated to form an integrated inertial sensing device.

19 Claims, 7 Drawing Sheets

ACCURATE GYROSCOPE DEVICE USING MEMS AND QUARTZ

CROSS-REFERENCES TO RELATED APPLICATIONS

The present application claims priority to and incorporates by reference, for all purposes, the following pending patent application: U.S. Pat. App. No. 61/296,370, filed Jan. 19, 2010. The present invention also incorporates by reference, for all purposes, the following co-pending patent applications related to CMOS & MEMS devices and IC fabrication methodology: U.S. patent application Ser. No. 12/490,067, filed Jun. 23, 2009, U.S. patent application Ser. No. 12/717,070, filed Mar. 3, 2010, U.S. patent application Ser. No. 12/945,087, filed Nov. 12, 2010, U.S. Pat. App. No. 61/356,467, filed Jun. 18, 2010, and U.S. patent application Ser. No. 12/913,440, filed Oct. 27, 2010.

BACKGROUND OF THE INVENTION

Embodiments of the present invention relates generally to integrated devices. More particularly, embodiments of the present invention provide a system and method for fabricating an integrated inertial sensing device. Merely by way of example, the integrated inertial sensing device can include one or more inertial sensing devices configured for one or more axis, with at least one inertial sensing device comprising at least a quartz material. But it will be recognized that the embodiments of the invention have a much broader range of applicability.

Research and development in integrated microelectronics have continued to produce astounding progress in CMOS and MEMS. CMOS technology has become the predominant fabrication technology for integrated circuits (IC). MEMS, however, continues to rely upon conventional process technologies. In layman's terms, microelectronic ICs are the "brains" of an integrated device which provides decision-making capabilities, whereas MEMS are the "eyes" and "arms" that provide the ability to sense and control the environment. Some examples of the widespread application of these technologies are the switches in radio frequency (RF) antenna systems, such as those in the iPhone™ device by Apple, Inc. of Cupertino, California, and the Blackberry™ phone by Research In Motion Limited of Waterloo, Ontario, Canada, and accelerometers in sensor-equipped game devices, such as those in the Wii™ controller manufactured by Nintendo Company Limited of Japan. Though they are not always easily identifiable, these technologies are becoming ever more prevalent in society every day.

Beyond consumer electronics, use of IC and MEMS has limitless applications through modular measurement devices such as accelerometers, gyroscopes, actuators, and sensors. In conventional vehicles, accelerometers and gyroscopes are used to deploy airbags and trigger dynamic stability control functions, respectively. MEMS gyroscopes can also be used for image stabilization systems in video and still cameras, and automatic steering systems in airplanes and torpedoes. Biological MEMS (Bio-MEMS) implement biosensors and chemical sensors for Lab-On-Chip applications, which integrate one or more laboratory functions on a single millimeter-sized chip only. Other applications include Internet and telephone networks, security and financial applications, and health care and medical systems. As described previously, ICs and MEMS can be used to practically engage in various type of environmental interaction.

Although highly successful, ICs and in particular MEMS still have limitations. Similar to IC development, MEMS development, which focuses on increasing performance, reducing size, and decreasing cost, continues to be challenging. Additionally, applications of MEMS often require increasingly complex microsystems that desire greater computational power. Unfortunately, such applications generally do not exist. These and other limitations of conventional MEMS and ICs may be further described throughout the present specification and more particularly below.

From the above, it is seen that techniques for improving operation of integrated circuit devices and MEMS are highly desired.

BRIEF SUMMARY OF THE INVENTION

According to embodiments of the present invention, techniques related generally to electronic and mechanical devices are provided. More particularly, the embodiments of the present invention provide an integrated inertial sensing device that is preferably integrated with one or more integrated circuits and other micro-electrical mechanical systems, commonly termed MEMS. Merely by way of example, the integrated inertial sensing device can include one or more inertial sensing devices configured for one or more axis, with at least one inertial sensing device comprising at least a quartz material. Additionally, the other applications include at least a sensor application or applications, system applications, and broadband applications, among others. But it will be recognized that the embodiments of the invention have a much broader range of applicability.

Embodiments of the present invention provide an integrated inertial sensing device (e.g., gyroscope). The device includes a substrate member. The device also has a first inertial sensing device comprising at least a first material (e.g., silicon) and configured to detect at least a first direction. The device has a second inertial sensing device comprising at least the first material and configured to detect at least a second direction. The device also has a third inertial sensing device comprising at least a quartz (or like) material and configured to detect at least a third direction. In a specific embodiment, the gyroscope is configured to detect orientation in each of the three dimensions or the like. Of course, there can be other variations, modifications, and alternatives.

Many benefits are achieved by way of various embodiments of the present invention over conventional techniques. For example, the present technique provides an easy to use process that relies upon conventional technology. In some embodiments, the method provides higher device yields in dies per wafer with the integrated approach. Additionally, the method provides a process and system that are compatible with conventional process technology without substantial modifications to conventional equipment and processes. Preferably, the embodiments of the invention provide for an improved inertial sensing device with greater accuracy and reliability. In one or more preferred embodiments, the present invention uses micro-machining techniques, such as those commonly used in the manufacture of MEMS and/or semiconductor devices. Depending upon the embodiment, one or more of these benefits may be achieved. These and other benefits will be described in more throughout the present specification and more particularly below.

Various additional embodiments, features, and advantages of the embodiments of the present invention can be more fully

DETAILED DESCRIPTION OF THE INVENTION

According to embodiments of the present invention, techniques related generally to integrated devices and systems are provided. More particularly, embodiments of the present invention provide a system and method for fabricated an integrated inertial sensing device. Merely by way of example, the integrated inertial sensing device can include one or more inertial sensing devices configured for one or more axis, with at least one inertial sensing device comprising at least a quartz material. Additionally, the other applications include at least a sensor application or applications, system applications, and broadband applications, among others. But it will be recognized that the invention has a much broader range of applicability.

Figure 1:
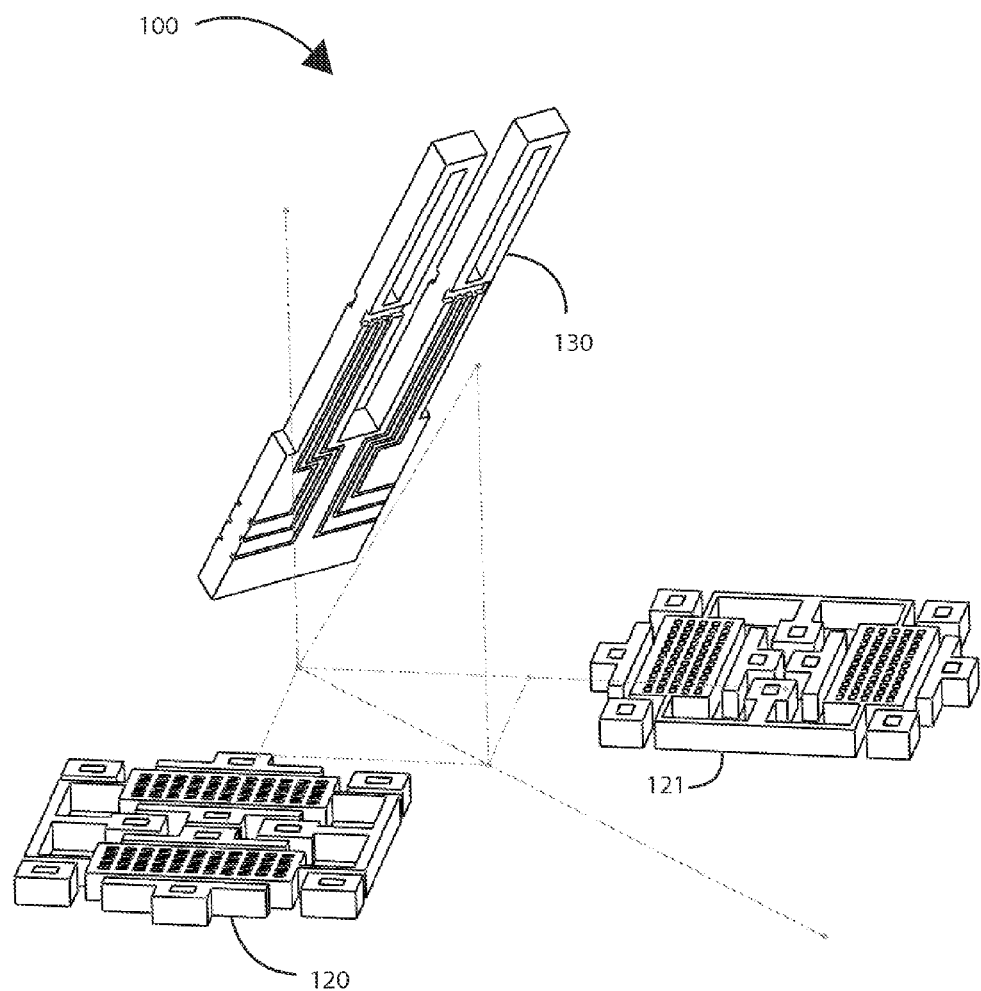
FIG. 1 is a simplified diagram illustrating a perspective view of a quartz and MEMS inertial sensing device according to an embodiment of the present invention.

FIG. 1 is a simplified diagram illustrating a perspective view of a quartz and MEMS inertial sensing device according to an embodiment of the present invention. This diagram is merely an example, which should not unduly limit the scope of the claims herein. One of ordinary skill in the art would recognize other variations, modifications, and alternatives. As shown, system 100 includes a first inertial sensing device 120, a second inertial sensing device 121, and a third inertial sensing device 130. Those of ordinary skill in the art will recognize other variations, modifications, and alternatives.

In a specific embodiment, the third inertial sensing device 130 can be operably coupled to both first sensing device 120 and the second sensing device 121. In various embodiments, third inertial sensing device 130 can be coupled to only first sensing device 120 or second sensing device 121. In further embodiments, third inertial sensing device 130 can be configured independently of first sensing device 120 and second sensing device 121. In a specific embodiment, first inertial sensing device 120 and second inertial sensing device 121 can be configured on the same spatial plane, such as an X-Y plane or Y-Z plane, and oriented in a perpendicular pattern on the spatial plane. In other embodiments, first sensing device 120 and second sensing device 121 can be oriented in any other pattern on the same spatial plane. In various embodiments, first sensing device 120 and second sensing device 121 can be configured on separate spatial planes (i.e., X-Y, Y-Z, X-Z), although the reference coordinates may be different. In a specific embodiment, third inertial sensing device 130 can be spatially disposed between first sensing device 120 and second sensing device 121. In a specific embodiment, third inertial sensing device 130 can be configured to be spatially disposed between the first sensing device 120 and second sensing device 121 at an angle of 54.7 degrees, but can be others. In other specific embodiments, third inertial sensing device 130 can be configured at other angles. In a specific embodiment, one or more modules can be coupled to first sensing device 120, second sensing device 121, and third inertial sensing device 130. Of course, there can be other variations, modifications, and alternatives.

In a specific embodiment, first sensing device 120 can be configured to detect at least a first direction and second sensing device 121 can be configured to detect at least a second direction. Third inertial sensing device 130 can also be configured to detect at least a third direction. Throughout the present disclosure, the term "direction" is sometimes used to refer to "orientation". In other embodiments, each sensing device (120, 121, and 130) can be configured to detect one or more directions. In a specific embodiment, the one or more modules can be configured to calibrate at least first inertial sensing device 120 to third inertial sensing device 130. The one or more modules can also be configured to calibrate at least second sensing device 121 to third inertial sensing device 130. In other specific embodiments, the one or more modules can be configured to associate at least first sensing device 120 to third inertial sensing device 130. The one or more modules can also be configured to associate at least second sensing device 121 to third inertial sensing device 130. In various embodiments, the one or more modules can include one or more CMOS integrated circuits, which can be formed overlying the substrate member. The one or more CMOS integrated circuits can be used to configure first inertial sensing device 120 and second inertial sensing 121 devices to use third inertial sensing device 130 as a reference device. Those skilled in the art will recognize other variations, modifications, and alternatives.

In a specific embodiment, first sensing device 120 is a first MEMS gyroscope and second sensing device 121 is a second MEMS gyroscope device. The first gyroscope and the second gyroscope can comprise at least a first material such as silicon (single crystalline, polycrystalline, amorphous, etc.), oxide, metal, or any other material and combinations thereof. Also, third inertial sensing device 130 can include a quartz substrate member, or a member comprising quartz, or other materials or a combination thereof. As said before, there can be other variations, modifications, and alternatives.

Many benefits are achieved by way of various embodiments of the present invention over conventional techniques. For example, the present technique provides an easy to use process that relies upon conventional technology. In some embodiments, the method provides higher device yields in dies per wafer with the integrated approach. Additionally, the method provides a process and system that are compatible with conventional process technology without substantial modifications to conventional equipment and processes. Preferably, the embodiments of the invention provide for an improved inertial sensing device with greater accuracy and reliability. The inherent stability of the quartz crystal makes it an ideal material as a sensor element. Quartz is resistant to temperature fluctuations, which makes it more resilient to degradation and better able to constant voltages in corresponding devices compared to other materials (such as ceramic materials). Compact quartz-based gyro-sensors, such as those created by Epson, can be manufactured to have great stability and environmental resistance with low power consumption. These sensors, and others, would be ideal to use as an accurate reference device. In various embodiments, MEMS devices would be able to achieve low production costs, making the integrated use of quartz and MEMS both cost-efficient and accurate. In one or more preferred embodiments, the present invention uses micro-machining techniques, such as those commonly used in the manufacture of MEMS and/or semiconductor devices. Depending upon the embodiment, one or more of these benefits may be achieved. These and other benefits will be described in more throughout the present specification and more particularly below.

It is also understood that the examples and embodiments described herein are for illustrative purposes only and that various modifications or changes in light thereof will be suggested to persons skilled in the art and are to be included within the spirit and purview of this application and scope of the appended claims. Further details of the integration of MEMS devices and quartz devices can be found throughout the present specification and more particularly below.

Figure 2:
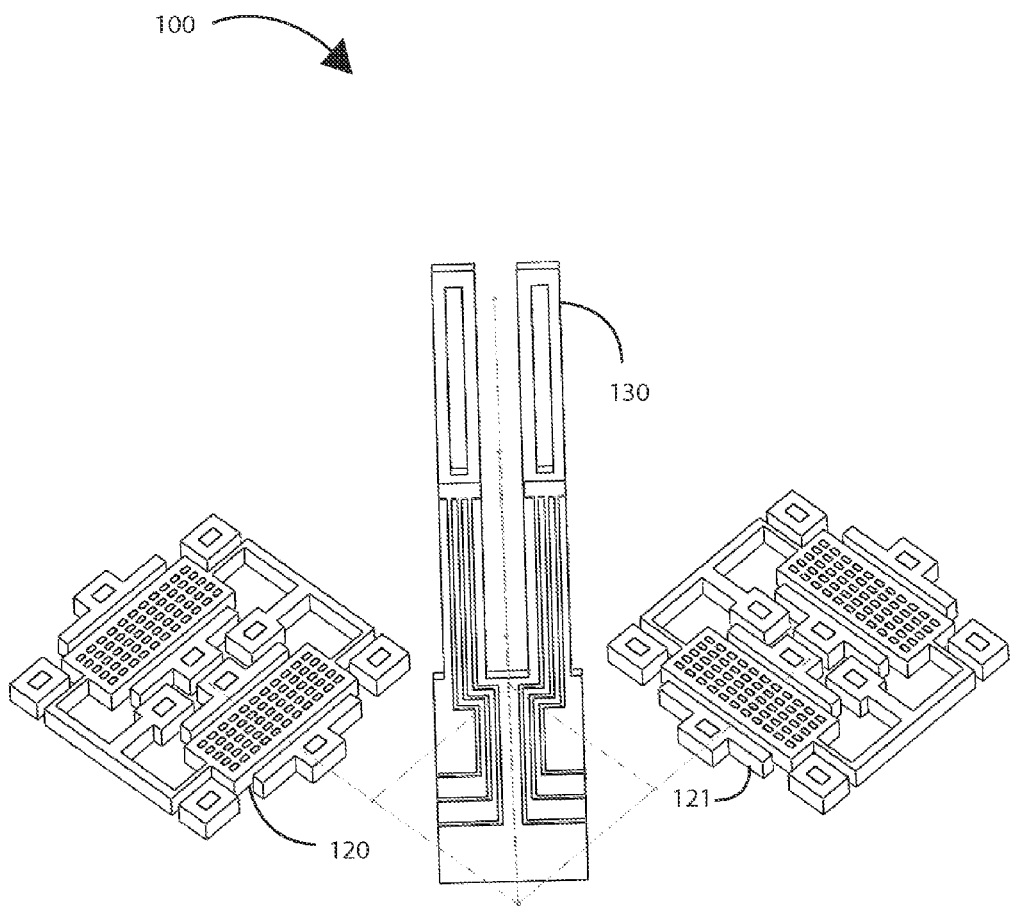
FIG. 2 is a simplified diagram illustrating a top view of a quartz and MEMS inertial sensing device according to an embodiment of the present invention.

FIG. 2 is a simplified diagram illustrating a top view of a quartz and MEMS inertial sensing device according to an embodiment of the present invention. This diagram is merely an example, which should not unduly limit the scope of the claims herein. One of ordinary skill in the art would recognize other variations, modifications, and alternatives. As shown, system 100 includes a first inertial sensing device 120, a second inertial sensing device 121, and a third inertial sensing device 130. A detailed description of the components of system 100 can be found above in the description for FIG. 1. Those of ordinary skill in the art will recognize other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

Figure 3:
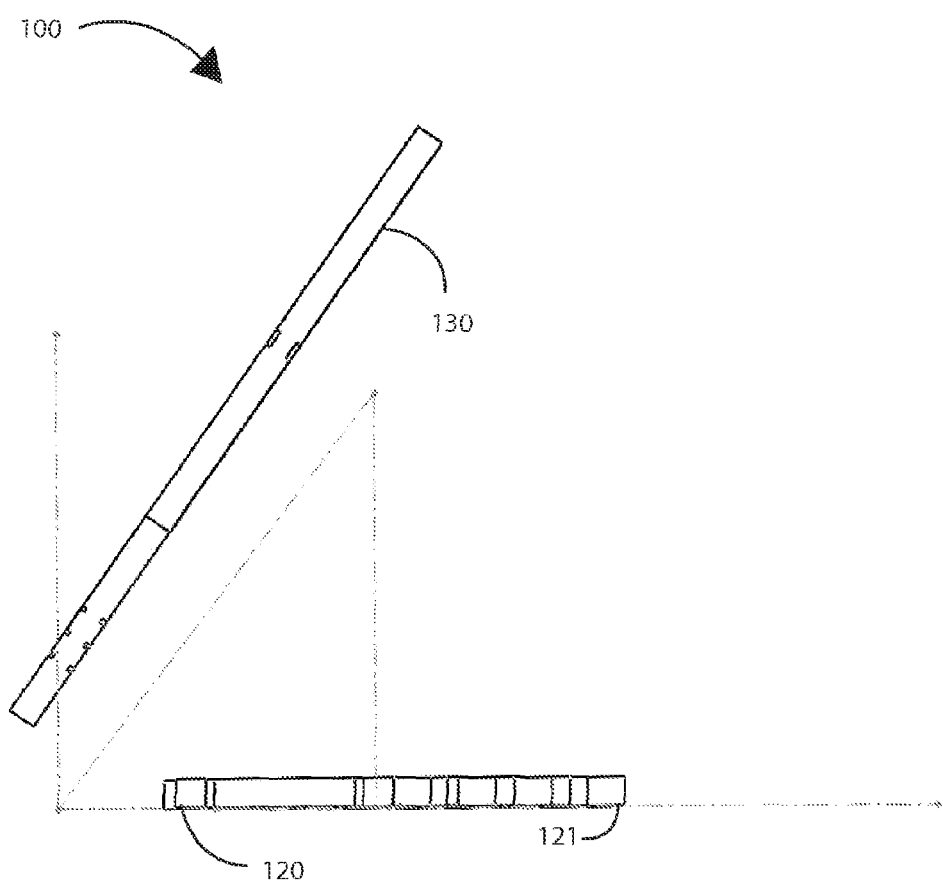
FIG. 3 is a simplified diagram illustrating a side view of a quartz and MEMS inertial sensing device according to an embodiment of the present invention.

FIG. 3 is a simplified diagram illustrating a side view of a quartz and MEMS inertial sensing device according to an embodiment of the present invention. This diagram is merely an example, which should not unduly limit the scope of the claims herein. One of ordinary skill in the art would recognize other variations, modifications, and alternatives. As shown, system 100 includes a first inertial sensing device 120, a second inertial sensing device 121, and a third inertial sensing device 130. A detailed description of the components of system 100 can be found above in the description for FIG. 1. Those of ordinary skill in the art will recognize other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

Figure 4:
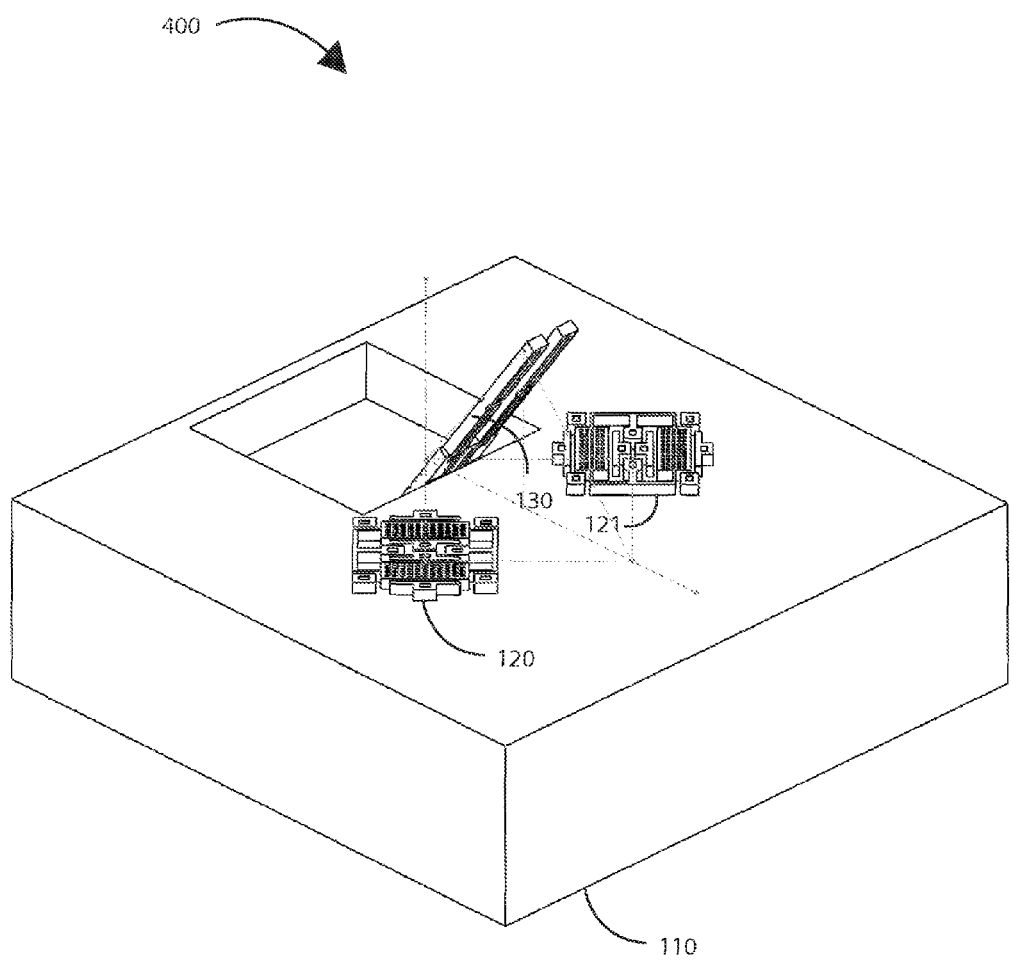
FIG. 4 is a simplified diagram illustrating a perspective view of a quartz and MEMS inertial sensing device according to an embodiment of the present invention.

FIG. 4 is a simplified diagram illustrating a perspective view of a quartz and MEMS inertial sensing device according to an embodiment of the present invention. This diagram is merely an example, which should not unduly limit the scope of the claims herein. One of ordinary skill in the art would recognize other variations, modifications, and alternatives. As shown, system 400 includes a substrate member 110, a first inertial sensing device 120, a second inertial sensing device 121, and a third inertial sensing device 130. Those of ordinary skill in the art will recognize other variations, modifications, and alternatives.

In a specific embodiment, the third inertial sensing device 130 can be operably coupled to both first sensing device 120 and the second sensing device 121. Both first inertial sensing device 120 and second inertial sensing device 121 can be integrated with substrate member 110. Also, third inertial sensing device 130 can be coupled to substrate member 110. In other embodiments, third inertial sensing device 130 can be coupled to only first sensing device 120 or second sensing device 121. In further embodiments, third inertial sensing device 130 can be configured independently of first sensing device 120 and second sensing device 121. In a specific embodiment, first inertial sensing device 120 and second inertial sensing device 121 can be configured on the same spatial plane, such as an X-Y plane or Y-Z plane, and oriented in a perpendicular pattern on the spatial plane. In other embodiments, first sensing device 120 and second sensing device 121 can be oriented in any other pattern on the same spatial plane. In further embodiments, first sensing device 120 and second sensing device 121 can be configured on separate spatial planes (i.e., X-Y, Y-Z, X-Z). In a specific embodiment, third inertial sensing device 130 can be spatially disposed between first sensing device 120 and second sensing device 121. In a specific embodiment, third inertial sensing device 130 can be configured to be spatially disposed between first sensing device 120 and second sensing device 121 at an angle of 54.7 degrees. In other specific embodiments, third inertial sensing device 130 can be configured at other angles. In a specific embodiment, one or more modules can be coupled to first sensing device 120, second sensing device 121, and third inertial sensing device 130. Of course, there can be other variations, modifications, and alternatives.

In a specific embodiment, first sensing device 120 can be configured to detect at least a first direction and second sensing device 121 can be configured to detect at least a second direction. Third inertial sensing device 130 can also be configured to detect at least a third direction. In other embodiments, each sensing device (120, 121, and 130) can be configured to detect one or more directions. In a specific embodiment, the one or more modules can be configured to calibrate at least first inertial sensing device 120 to third inertial sensing device 130. The one or more modules can also be configured to calibrate at least second sensing device 121 to third inertial sensing device 130. In other specific embodiments, the one or more modules can be configured to associate at least first sensing device 120 to third inertial sensing device 130. The one or more modules can also be configured to associate at least second sensing device 121 to third inertial sensing device 130. In various embodiments, the one or more modules can include one or more CMOS integrated circuits, which can be formed overlying the substrate member. The one or more CMOS integrated circuits can be used to configure first inertial sensing device 120 and second inertial sensing 121 devices to use third inertial sensing device 130 as a reference device. Those skilled in the art will recognize other variations, modifications, and alternatives.

In a specific embodiment, first sensing device 120 is a first MEMS gyroscope and second sensing device 121 is a second MEMS gyroscope device. In a specific embodiment, the first gyroscope and the second gyroscope can comprise at least a first material such as silicon (single crystalline, polycrystalline, amorphous, etc.), oxide, metal, or any other material and combinations thereof. Also, third inertial sensing device 130 can include a quartz substrate member, or a member comprising quartz, or other materials and combinations thereof. In a specific embodiment, substrate member 110 can include quartz, silicon, metal, or any other materials and combinations thereof. As said before, there can be other variations, modifications, and alternatives.

Many benefits are achieved by way of various embodiments of the present invention over conventional techniques. For example, the present technique provides an easy to use process that relies upon conventional technology. In some embodiments, the method provides higher device yields in dies per wafer with the integrated approach. Additionally, the method provides a process and system that are compatible with conventional process technology without substantial modifications to conventional equipment and processes. Preferably, the embodiments of the invention provide for an improved inertial sensing device with greater accuracy and reliability. The inherent stability of the quartz crystal makes it an ideal material as a sensor element. Quartz is resistant to temperature fluctuations, which makes it more resilient to degradation and better able to constant voltages in corresponding devices compared to other materials (such as ceramic materials). Compact quartz-based gyro-sensors, such as those created by Epson, can be manufactured to have great stability and environmental resistance with low power consumption. These sensors, and others, would be ideal to use as an accurate reference device. In various embodiments, MEMS devices would be able to achieve low production costs, making the integrated use of quartz and MEMS both cost-efficient and accurate. In one or more preferred embodiments, the present invention uses micro-machining techniques, such as those commonly used in the manufacture of MEMS and/or semiconductor devices. Depending upon the embodiment, one or more of these benefits may be achieved. These and other benefits will be described in more throughout the present specification and more particularly below.

It is also understood that the examples and embodiments described herein are for illustrative purposes only and that various modifications or changes in light thereof will be suggested to persons skilled in the art and are to be included within the spirit and purview of this application and scope of the appended claims.

Figure 5:
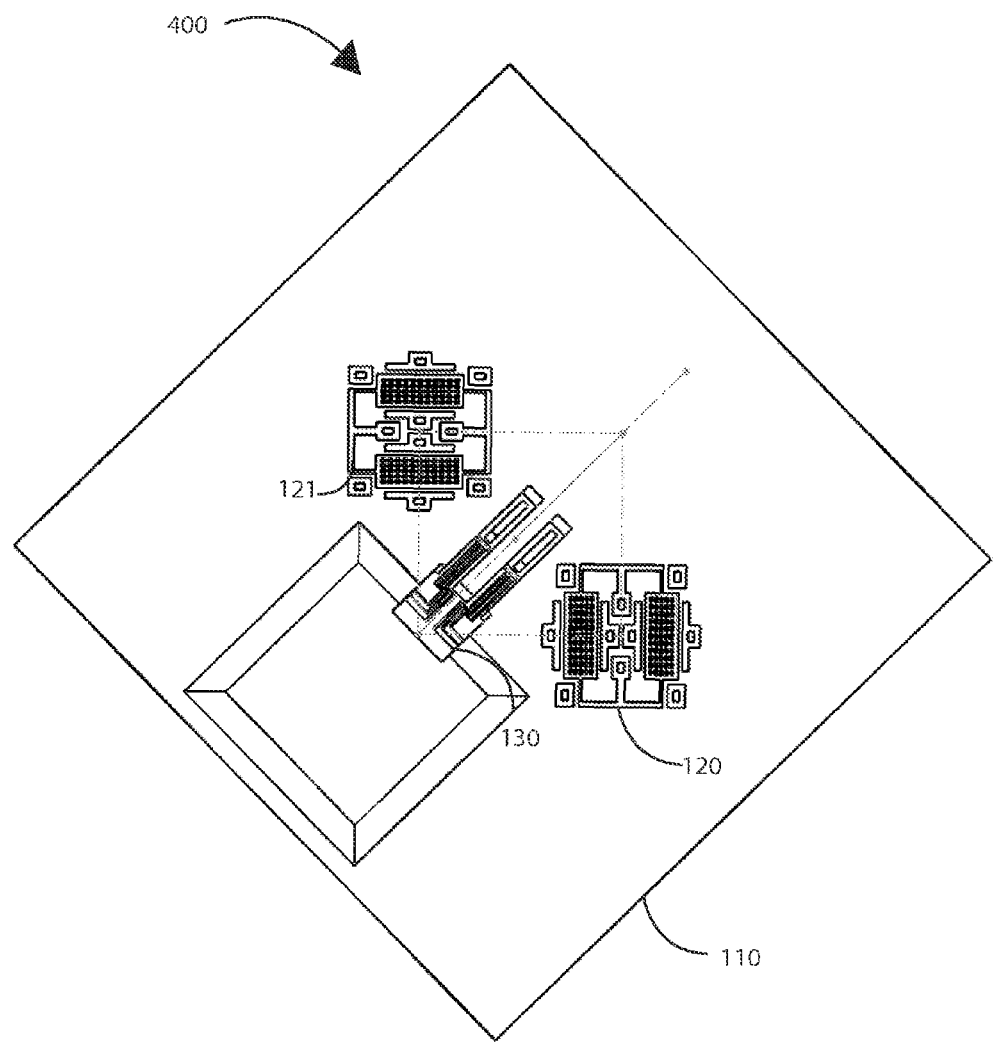
FIG. 5 is a simplified diagram illustrating a top view of a quartz and MEMS inertial sensing device according to an embodiment of the present invention.

FIG. 5 is a simplified diagram illustrating a top view of a quartz and MEMS inertial sensing device according to an embodiment of the present invention. This diagram is merely an example, which should not unduly limit the scope of the claims herein. One of ordinary skill in the art would recognize other variations, modifications, and alternatives. As shown, system 100 includes a substrate member 110, a first inertial sensing device 120, a second inertial sensing device 121, and a third inertial sensing device 130. A detailed description of the components of system 100 can be found above in the description for FIG. 4. Those of ordinary skill in the art will recognize other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

Figure 6:
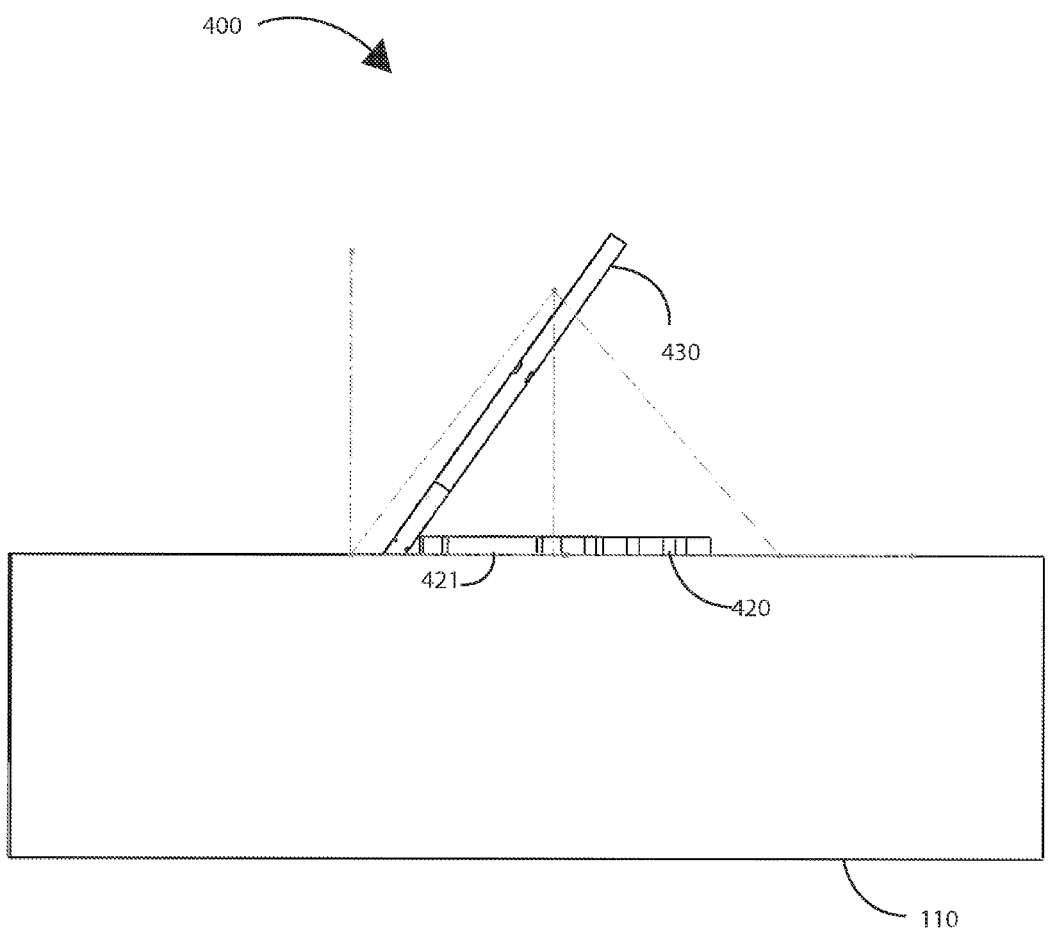
FIG. 6 is a simplified diagram illustrating a side of a quartz and MEMS inertial sensing device according to an embodiment of the present invention.

FIG. 6 is a simplified diagram illustrating a side view of a quartz and MEMS inertial sensing device according to an embodiment of the present invention. This diagram is merely an example, which should not unduly limit the scope of the claims herein. One of ordinary skill in the art would recognize other variations, modifications, and alternatives. As shown, system 100 includes a substrate member 110, a first inertial sensing device 120, a second inertial sensing device 121, and a third inertial sensing device 130. A detailed description of the components of system 100 can be found above in the description for FIG. 4. Those of ordinary skill in the art will recognize other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

Figure 7:
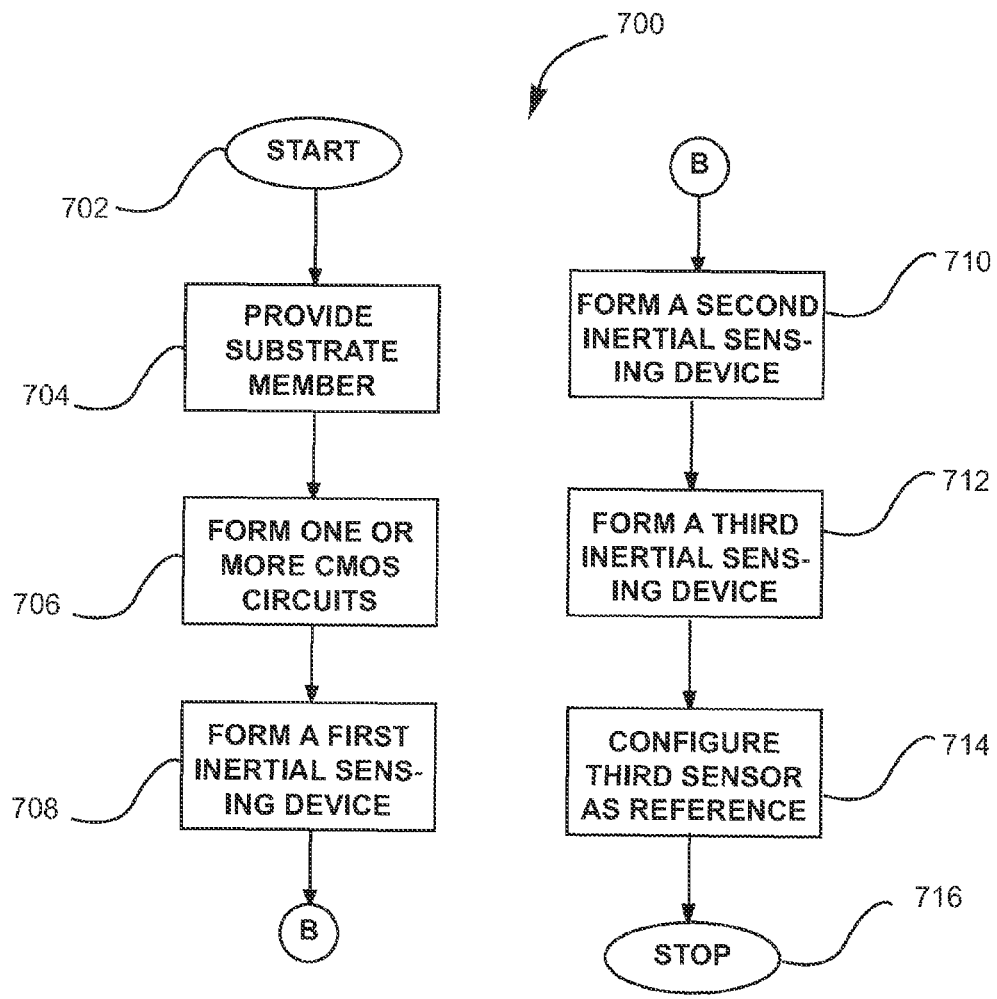
FIG. 7 is a simplified flow diagram illustrating a method of fabricating an integrated inertial sensing device according to an embodiment of the present invention.

FIG. 7 is a simplified flow diagram illustrating a method of fabricating an integrated inertial sensing device according to an embodiment of the present invention. This diagram is merely an example, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

As shown in FIG. 7, the present method can be briefly outlined below.

1. Start;
2. Provide a substrate member;
3. Form one or more CMOS circuits overlying the substrate member;
4. Form a first inertial sensing device coupled to the CMOS circuit(s);
5. Form a second inertial sensing device coupled to the CMOS circuit(s);
6. Form a third inertial sensing device overlying the substrate member;
7. Configure the first and second inertial sensing devices to use the quartz inertial sensing device as a reference device; and
8. Stop.

These steps are merely examples and should not unduly limit the scope of the claims herein. As shown, the above method provides a way of fabricating an integrated inertial sensing device using quartz and MEMS according to an embodiment of the present invention. One of ordinary skill in the art would recognize many other variations, modifications, and alternatives. For example, various steps outlined above may be added, removed, modified, rearranged, repeated, and/or overlapped, as contemplated within the scope of the invention.

As shown in FIG. 7, method 700 begins at start, step 702. The present method provides a fabrication method for forming an integrated inertial sensing device using quartz and MEMS. Many benefits are achieved by way of various embodiments of the present invention over conventional techniques. For example, the present technique provides an easy to use process that relies upon conventional technology. In some embodiments, the method provides higher device yields in dies per wafer with the integrated approach. Additionally, the method provides a process and system that are compatible with conventional process technology without substantial modifications to conventional equipment and processes. Preferably, the embodiments of the invention provide for an improved integrated inertial sensing device with greater accuracy and reliability. The inherent stability of the quartz crystal makes it an ideal material as a sensor element. Quartz is resistant to temperature fluctuations, which makes it more resilient to degradation and better able to constant voltages in corresponding devices compared to other materials (such as ceramic materials). Compact quartz-based gyro-sensors, such as those created by Epson, can be manufactured to have great stability and environmental resistance with low power consumption. These sensors, and others, would be ideal to use as an accurate reference device. In one or more preferred embodiments, the present invention uses micro-machining techniques, such as those commonly used in the manufacture of MEMS and/or semiconductor devices. Depending upon the embodiment, one or more of these benefits may be achieved. These and other benefits will be described in more throughout the present specification and more particularly below.

Following step 702, fabrication method 700 involves providing a substrate member having a first surface region, step 704. In an embodiment, the substrate member can be a semiconductor substrate, silicon substrate, or substrate-on-insulator. A layer of material can also be formed overlying the substrate. In a specific embodiment, the layer of material disposed overlying the substrate can be a buried oxide (BOX) layer. In another specific embodiment, the layer of material disposed overlying the thickness of silicon material can be an epitaxial (EPI) layer or the first semiconductor substrate can have just the thickness of silicon material. In further embodiments, the first and second semiconductor substrate can have a silicon, single crystal silicon, or polycrystalline silicon material. Those skilled in the art will recognize other variations, modifications, and alternatives.

In an embodiment, the substrate member can have a first surface region and a CMOS device region can be a region overlying the first surface region. One or more CMOS IC devices can be formed on the CMOS IC device region overlying the first surface region, step 706. The CMOS IC device region can have a CMOS surface region. In a specific embodiment, the one or more CMOS IC devices can include transistor devices, metal layers, via structures, and others. In further embodiments, additional transistors, metal layers, and structures can be added. The fabrication of the one or more CMOS IC devices can be done through foundry-compatible processes. Of course, there can be other variations, modifications, and alternatives.

A first inertial sensing device, step 708, and a second inertial sensing device, step 710, can be formed overlying the substrate member. The first and second inertial sensing devices can be coupled to the one or more CMOS device. A third inertial sensing device, step 712, can be also be formed overlying the substrate member. In a specific embodiment, the third inertial sensing device can be operably coupled to both first sensing device and the second sensing device. In various embodiments, the third inertial sensing device can be coupled to only first sensing device or second sensing device. In further embodiments, the third inertial sensing device can be configured independently of first sensing device and second sensing device. Those skilled in the art will recognize over variations, modifications, and alternatives.

In a specific embodiment, the first inertial sensing device and the second inertial sensing device can be configured on the same spatial plane, such as an X-Y plane or Y-Z plane, and oriented in a perpendicular pattern on the spatial plane. In other embodiments, the first sensing device and the second sensing device can be oriented in any other pattern on the same spatial plane. In various embodiments, the first sensing device and the second sensing device can be configured on separate spatial planes (i.e., X-Y, Y-Z, X-Z), although the reference coordinates may be different. In a specific embodiment, the third inertial sensing device can be spatially disposed between the first sensing device and the second sensing device. In a specific embodiment, the third inertial sensing device can be configured to be spatially disposed between the first sensing device and the second sensing device at an angle of 54.7 degrees, but can be others. In other specific embodiments, the inertial sensing device can be configured at other angles. In a specific embodiment, one or more modules can be coupled to the first sensing device, the second sensing device, and the third inertial sensing device. Of course, there can be other variations, modifications, and alternatives.

In a specific embodiment, the first sensing device can be configured to detect at least a first direction and the second sensing device can be configured to detect at least a second direction. The third inertial sensing device can also be configured to detect at least a third direction. In other embodiments, each sensing device can be configured to detect one or more directions or one or more orientations. In a specific embodiment, the one or more modules can be configured to calibrate at least the first inertial sensing device to the third inertial sensing device. The one or more modules can also be configured to calibrate at least the second sensing device to the third inertial sensing device. In other specific embodiments, the one or more modules can be configured to associate at least the first sensing device to the third inertial sensing device. The one or more modules can also be configured to associate at least the second sensing device to the third inertial sensing device. In various embodiments, the one or more modules can include one or more CMOS integrated circuits, which can be formed overlying the substrate member. The one or more CMOS integrated circuits can be used to configure the first inertial sensing device and second inertial sensing devices to use the third inertial sensing device as a reference device, step 714. Those skilled in the art will recognize other variations, modifications, and alternatives.

In a specific embodiment, the first sensing device is a first MEMS gyroscope and the second sensing device is a second MEMS gyroscope device. The first gyroscope and the second gyroscope can comprise at least a first material such as silicon (single crystalline, polycrystalline, amorphous, etc.), oxide, metal, or any other material and combinations thereof. Also, the third inertial sensing device can include a quartz substrate member, or a member comprising quartz, or other materials or a combination thereof. As said before, there can be other variations, modifications, and alternatives.

The above sequence of processes provides a fabrication method for forming an inertial sensing device using quartz and MEMS according to an embodiment of the present invention. As shown, the method uses a combination of steps including providing a substrate member, forming CMOS devices, forming a first and second inertial sensing device, forming a third inertial sensing device, and configuring the first and second inertial sensing device to use the third inertial sensing device as a reference device. Other alternatives can also be provided where steps are added, one or more steps are removed, or one or more steps are provided in a different sequence without departing from the scope of the claims herein. Further details of the present method can be found throughout the present specification.

What is claimed is:

1. An integrated inertial sensing device comprising:
   a substrate member;
   a first inertial sensing device comprising at least a first material and configured to detect at least a first direction, the first inertial sensing device being integrated with the substrate member;
   a second inertial sensing device comprising at least the first material and configured to detect at least a second direction, the second inertial sensing device being integrated with the substrate member; and a third inertial sensing device comprising at least a quartz material and configured to detect at least a third direction, wherein the third inertial sensing device is spatially disposed between the first inertial sensing device and the second inertial sensing device at an angle of 54.7 degrees with respect to the plane defined by the first and second directions.

2. The device of claim 1 wherein the third inertial sensing device is operably coupled to the first inertial sensing device and the second inertial sensing device.

3. The device of claim 2 further comprising one or more modules coupled to the first inertial sensing device, the second inertial sensing device, and the third inertial sensing device.

4. The device of claim 3 wherein the one or more modules are configured to calibrate at least the first inertial sensing device to the third inertial sensing device.

5. The device of claim 4 wherein the one or more modules are configured to calibrate at least the second inertial sensing device to the third inertial sensing device.

6. The device of claim 3 wherein the one or more modules are configured to associate at least the first inertial sensing device to the third inertial sensing device.

7. The device of claim 6 wherein the one or more modules are configured to associate at least the second inertial sensing device to the third inertial sensing device.

8. The device of claim 1 wherein the first inertial sensing device is a first MEMS gyroscope device.

9. The device of claim 1 wherein the second inertial sensing device is a second MEMS gyroscope device.

10. The device of claim 1 wherein the third inertial sensing device is a quartz-based gyroscope device.

11. The device of claim 1 wherein the first material comprises a silicon, dielectric, or metal material.

12. The device of claim 1 wherein the substrate member comprises silicon.

13. An integrated inertial sensing device comprising:
a substrate member;
one or more CMOS integrated circuits formed overlying the substrate member;
a first MEMS inertial sensing device comprising at least a first material and configured to detect at least a first direction, the first inertial sensing device being coupled to the one or more CMOS integrated circuits;
a second MEMS inertial sensing device comprising at least the first material and configured to detect at least a second direction, the second inertial sensing device being coupled to the CMOS integrated circuits; and
an inertial sensing device comprising at least a quartz material and configured to detect at least a third direction, the inertial sensing device being coupled to the CMOS integrated circuits, the inertial sensing device being configured as a reference device for the first and second MEMS inertial sensing devices via the one or more CMOS integrated circuits, wherein the inertial sensing device is spatially disposed between the first MEMS inertial sensing device and the second MEMS inertial sensing device at an angle of 54.7 degrees with respect to the plane defined by the first and second directions.

14. A method of fabricating an integrated inertial sensing device comprising:
providing a substrate member;
forming one or more CMOS circuits overlying the substrate member;
forming one or more CMOS circuits overlying the substrate member;
forming a first inertial sensing device having at least a first material, the first inertial sensing device being configured to detect at least a first direction, the first inertial sensing device being coupled to the one or more CMOS circuits;
forming a second inertial sensing device having at least the first material, the second inertial sensing device being configured to detect at least a second direction, the second inertial sensing device being coupled to the one or more CMOS circuits;
forming a third inertial sensing device comprising at least a quartz material and configured to detect at least a third direction, the inertial sensing device being formed overlying the substrate member, wherein the third inertial sensing device is spatially disposed between the first inertial sensing device and the second inertial sensing device at an angle of 54.7 degrees with respect to the plane defined by the first and second directions;
configuring the first and second inertial sensing devices to use the third inertial sensing device as a reference device for calibration.

15. The method of claim 14 wherein the first inertial sensing device is a first MEMS gyroscope device.

16. The method of claim 14 wherein the second inertial sensing device is a second MEMS gyroscope device.

17. The method of claim 14 wherein the third inertial sensing device is a quartz-based gyroscope device.

18. The method of claim 14 wherein the first material comprises silicon, dielectric, or metal material.

19. The method of claim 14 wherein the substrate member comprises silicon.

\* \* \* \* \*